United States Patent [19]
Rowland-Hill

[11] 3,916,912
[45] Nov. 4, 1975

[54] AXIAL FLOW COMBINE

[75] Inventor: Edward W. Rowland-Hill, Lancaster, Pa.

[73] Assignee: Sperry Rand Corporation, New Holland, Pa.

[22] Filed: June 3, 1974

[21] Appl. No.: 476,019

[52] U.S. Cl............................. 130/27 T; 130/27 E
[51] Int. Cl.² ........................................ A01F 12/44
[58] Field of Search.... 130/27 T, 27 M, 27 E, 27 R, 130/27 P, 27 Z

[56] References Cited
UNITED STATES PATENTS

| | | | |
|---|---|---|---|
| 1,397,347 | 11/1921 | Wood | 130/27 E |
| 1,864,033 | 6/1932 | Wettlaufer | 130/27 E |
| 2,638,181 | 5/1953 | Gordon | 130/27 M |
| 3,669,122 | 6/1972 | Hill | 130/27 T |

Primary Examiner—George J. Marlo
Attorney, Agent, or Firm—John R. Flanagan; Frank A. Seemar; Joseph A. Brown

[57] ABSTRACT

An axial flow combine employs a rear discharge beater assembly to separate any grain entwined in the mat of crop material exiting from the threshing and separating means of the combine. An air impervious plate, positioned to the rear of the beater assembly, is used to control the air flow generated by the beater assembly so as to substantially prevent disruptive air currents from being formed and interfering with the effective operation of the combine. Also, the plate prevents crop material impelled rearwardly, by the beater, from being deflected downwardly onto the cleaning sieves of the combine.

6 Claims, 3 Drawing Figures

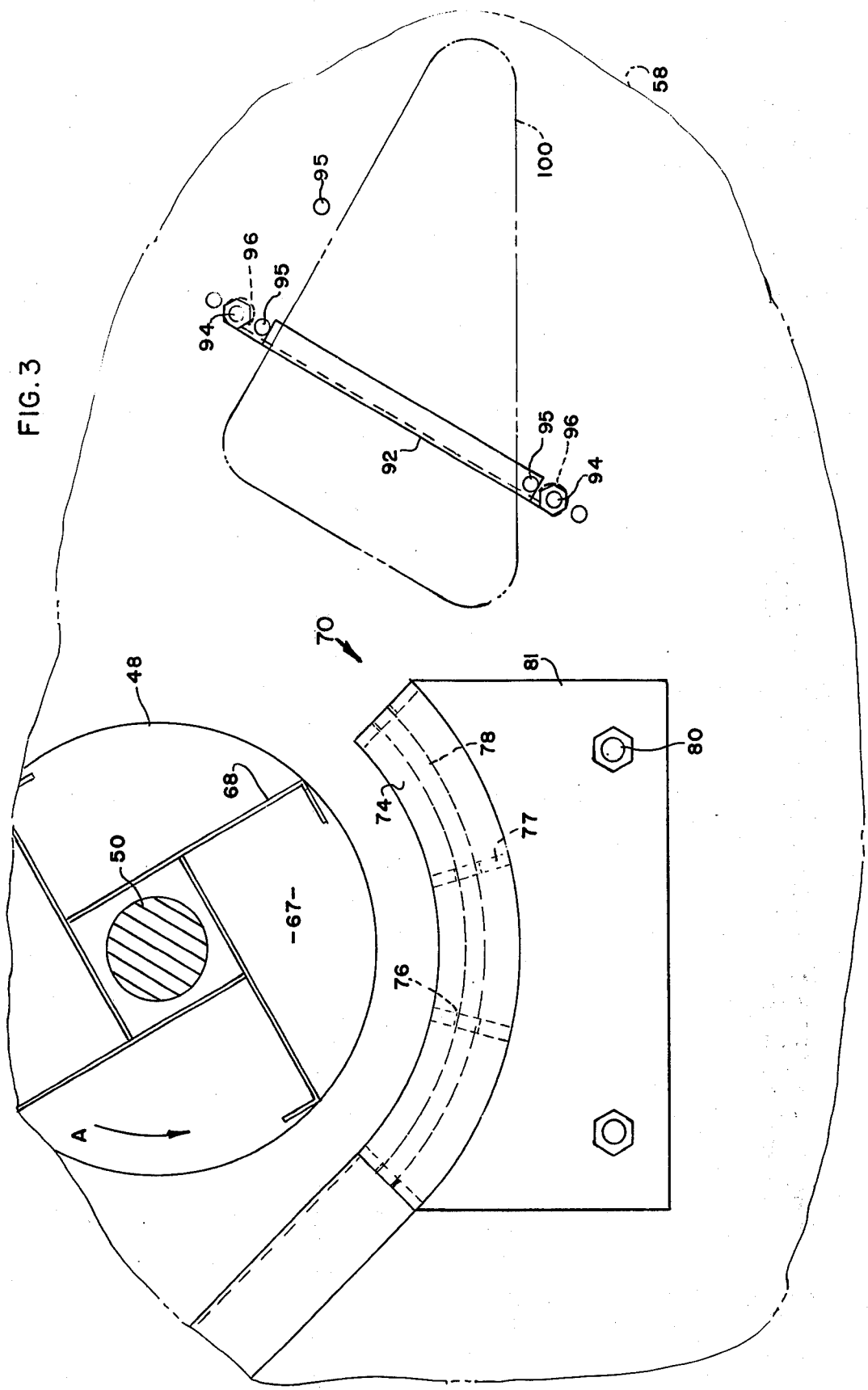

AXIAL FLOW COMBINE

BACKGROUND OF THE INVENTION

The present invention is directed to axial flow type combines and more particularly to the elimination of disruptive air currents generated in the immediate vicinity of the cleaning sieves.

The present invention is generally incorporated in an axial flow combine having side-by-side axial flow units. This type axial flow combine is described and fully shown in U.S. Pat. No. 3,669,122, issued to Edward William Rowland-Hill and entitled, "Axial Flow Combine with a Rotary Discharge". This patent is specifically directed to an axial flow combine incorporating a rear discharge beater assembly which re-directs the flow of the mat of crop material prior to the material's discharge from the combine. This re-direction of the mat of crop material acts to separate any grain which may be entwined in the mat of material. This beater assembly also impels the crop material in a rearward direction thereby discharging the material from the combine after it has been threshed and separated.

During the operation of axial flow combines incorporating this type of beater assembly, it has been found that the air flow, generated by the beater assembly, interferes with the air flow generated by the blower of the cleaning means, thereby creating undesirable and disruptive air currents above the cleaning sieves of the cleaning means. These disruptive air currents disturb the grain positioned on the cleaning sieves and often cause the grain to be blown off of the sieves and out the discharge opening of the combine. This type of grain loss can be substantial, thereby decreasing the efficiency of the combine to unacceptable levels. The disruptive air currents also have a tendency to block the flow of air through the cleaning sieves, thereby eliminating the pneumatic effect this air flow has on the material positioned on the cleaning sieves. When the air flow through the sieves is terminated, the crop material positioned on the sieves is moved rearwardly by the reciprocating action of the sieves off the end of the sieves and out the discharge end of the combine.

Further, it has been noted that the beater assembly, described in U.S. Pat. No. 3,669,122, expels the mat of crop material upwardly and rearwardly with such a force as to cause portions of the material to hit the roof of the combine and be deflected downwardly onto the cleaning sieves. Damage has been caused when portions of the crop material (e.g. cob material) are deflected down from the roof of the combine onto the cleaning sieves.

Therefore, it is the purpose of this invention to provide a means for eliminating the undesirable features discussed hereinabove.

OBJECTS AND SUMMARY OF THE INVENTION

It is the primary object of the present invention to provide an axial flow combine having a means for controlling the air flow generated by the rear discharge beater assembly and the blower associated with the cleaning means to prevent any disruptive air currents from being generated and interfering with the operation of the combine.

Another object of this invention is to provide an axial flow combine having a means for deflecting the mat of crop material, impelled rearwardly, by the rear discharge beater so as to decrease the force exerted on the cleaning sieves by crop material which may fall on the sieves.

Another object of this invention is to provide an axial flow combine having a means for controlling the air flow over the cleaning sieves of the cleaning means which will not interfere with the discharge operation of the rear beater.

In summary, an axial flow combine employs a rear discharge beater assembly to separate any grain remaining entwined in the mat of crop material exiting from the threshing and separating means. An air impervious plate positioned to the rear of the discharge beater assembly is used to control the air flow generated by the beater assembly so as to prevent any disruptive air currents from being formed and interfering with the effective operation of the combine. Also, the plate prevents crop material impelled rearwardly, by the beater, from being deflected downwardly onto the cleaning sieves of the combine.

These and other objects and advantages of this invention will be apparent to those skilled in the art after a consideration of the following detailed description, taken in conjunction with the accompanying drawings, in which the preferred form of this invention is illustrated.

BRIEF DESCRIPTION OF THE DRAWINGS

FIG. 3 is an end view taken along lines 3—3 of FIG. 2.

DETAILED DESCRIPTION OF THE PREFERRED EMBODIMENT

Figure 1:
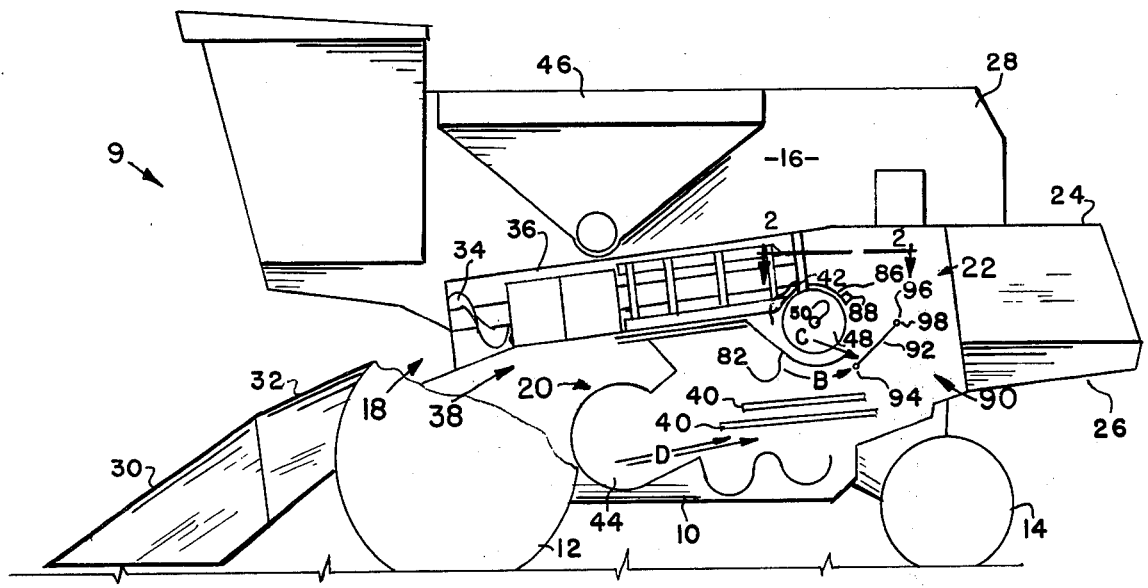
FIG. 1 is a side view of an axial flow combine.

As previously mentioned, the type of axial flow combine in which this invention is embodied is disclosed in the aforementioned U.S. Pat. No. 3,669,122. As shwon in FIG. 1, the axial flow combine 9, described herein, generally has a supporting frame 10, mounted on a pair of large front drive wheels 12 and a pair of smaller rear steering wheels 14, (only one wheel of each pair being shown). A housing 16 is mounted on the frame and encloses and supports the axial flow threshing and separating means 18, cleaning means 20 and rear discharge beater assembly 22. The housing extends rearwardly and has hood 24 mounted at its rear for enclosing the back of the housing and providing a downwardly facing opening 26 to discharge the threshed and separated crop material to the ground.

An engine 28 is mounted on the rear portion of the housing for providing the power necessary to drive the various components, of the combine, by suitable drive means, not shown.

Mounted to the forward end of the frame is header 30. The header cuts and harvests the crop material and delivers a mat of crop material rearwardly to crop elevator 32.

The crop elevator receives the crop material from the header and continues to convey it upwardly and rearwardly to the forward end of the threshing and separating means 18. The forward end of the threshing and separating means comprises a feed auger 34, which receives the incoming crop material and transports it rearwardly and circumferentially through casing 36. Once the mat of material passes the feed auger, it enters the threshing and separating area 38 of the threshing and separating means. When the crop material is in threshing and separating area 38, it continues to be circumferentially directed through casing 36. As the crop material passes through the casing, it passes over various concaves and grates, not shown, positioned at the bottom of casing 36, which loosen and remove grain from the mat of material. The grain removed from the crop material passes theough the concaves and grates and lands on cleaning sieves 40 of cleaning means 20. These cleaning sieves are transversely mounted between the sidewalls of the housing below the threshing and separating means. The majority of the grain contained in the crop material is removed while the material passes through the threshing and separating area of the threshing and separating means. A small amount of grain loosened in the threshing and separating area remains entwined in the mat of crop material passing out of opening 42. The threshed and separated crop material passing through opening 42 is delivered downwardly and rearwardly to rear discharge beater assembly, at which time the direction of travel of the crop material (i.e. circumferential through the threshing and separating means) is changed to a linear motion, as indicated by arrow B of FIG. 1. This change in direction causes much of the grain entwined in the crop material to be separated from the mat of crop material prior to its discharge to the ground. Grain removed by the rear discharge beater is deposited on the rear portion of the cleaning sieves.

The cleaning means is mounted below the threshing and separating means and comprises blower 44 which delivers a stream of air upwardly and rearwardly through cleaning sieves 40, as indicated in FIG. 1 by arrow D. This air flow is such as to blow any chaff material on the cleaning sieves off the sieves and through opening 26. The clean grain is then sifted through the sieves and conveyed by a grain elevator, not shown, to grain tank 46. Material on the cleaning sieves, which is not sifted through the sieves and not blown through opening 26, is conveyed by a tailings auger, not shown, to the threshing and separating area of the threshing and separating means for further processing.

REAR DISCHARGE BEATER

Figure 2:
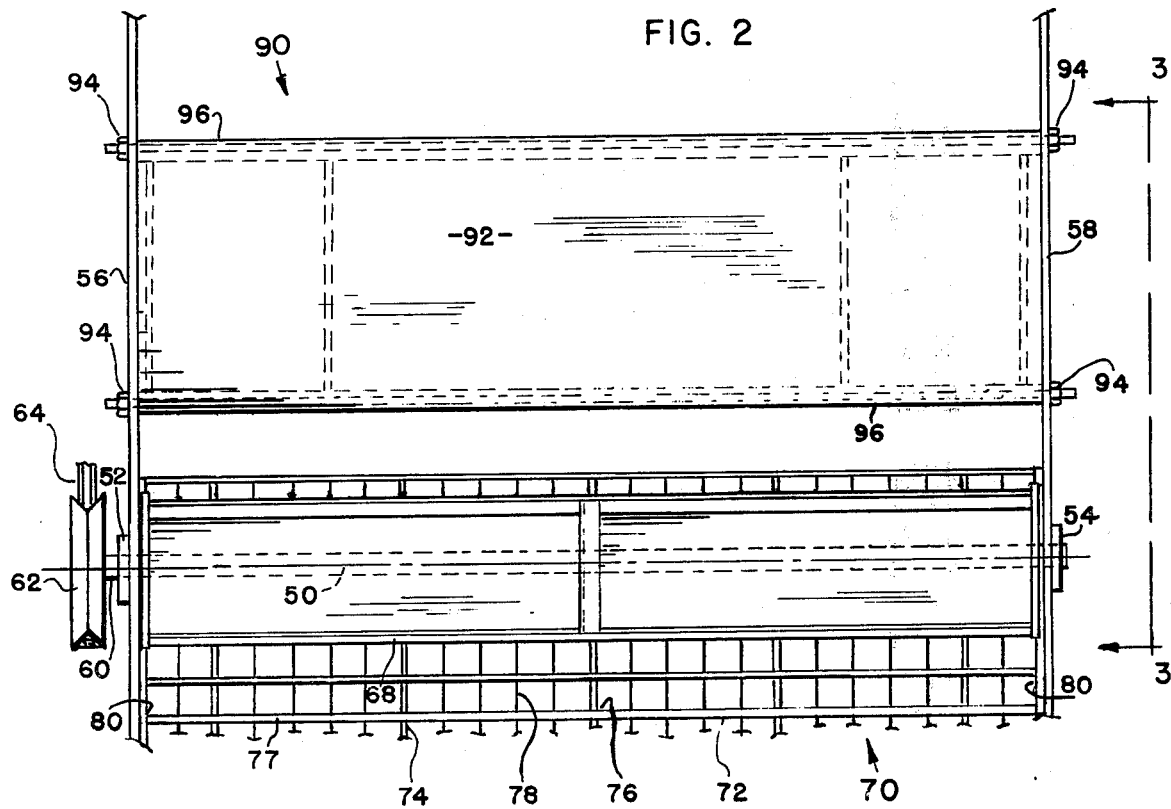
FIG. 2 is a view of the rear discharge beater assembly and the controlling means taken along lines 2—2 of FIG. 1.

The rear discharge beater assembly 22, of the present invention, includes beater 48 mounted on rotatable shaft 50. Shaft 50 is mounted in bearings 52, 54 which are secured to the sidewalls 56, 58 of housing 16. The axis of shaft 50 is positioned below and to the rear of opening 42 of the threshing and separating means. End 60 of the shaft extends through sidewall 56 (the right sidewall) of the housing, as shown in FIG. 2. Mounted to end 60 is a sheave 62 around which belt 64 is placed. This belt is driven from a drive sheave, not shown, is driven by engine 28. Rigidly secured to shaft 50 between the sidewalls of the housing are mounting blocks 66. These mounting blocks are spaced along the shaft and extend radially a short distance from the shaft. Secured to the mounting blocks (by welding or the like) are a plurality of L-shaped paddles 68 which extend substantially radially and outwardly from the shaft. Discs 67 are rigidly mounted on either end of shaft 50 to support paddles 68. These paddles rotate in a counterclockwise direction, when viewed from the left side of the combine, as illustrated in FIG. 3 by arrow A, and engage and impel the mat of crop material rearwardly towards rear opening 26.

Adjustably mounted directly below the outer periphery of the paddles is a concave shaped grate assembly 70. This grate assembly can have several configurations depending on the various crop material being harvested. The grate assembly illustrated in FIG. 2, includes a lattice-type grate 72, comprising a plurality of parallel spaced curved rods 74 extending fore-and-aft and positioned directly underneath the paddles of beater 48. The rods are evenly spaced parallel to each other between the sidewalls of housing 16. These rods are maintained in relative position to each other by bars 77 which extend transversely across and interconnect rods 74. The bars contain apertures 76 which are aligned so that the wires 78 can extend therethrough thereby creating the lattice shown in FIG. 2. The end rods are secured to mounting plate 81 which is adjustably mounted to the sidewalls 56, 58 by nuts and bolts 80. A ramp 82 is positioned immediately in front of the grate 72 and extends forwardly and upwardly so as to be positioned directly below opening 42. This ramp is comprised of a solid sheet of metal which has its forwardmost end mounted to the underside of opening 42, while its rear end is mounted to the forwardmost portion of grate 72. This ramp acts to guide the mat of crop material exiting from opening 42 to a position between the outer periphery of paddles 68 and the top portion of grate 72.

A curved wall 86 is mounted to the sidewalls of housing 16 and extends above the first quadrant of beater 48. The curved wall is positioned beyond the outer periphery of paddles 68 to prevent crop material from inadvertently moving out of contact with the paddles prior to being drawn across grate 72. Curved wall 86 also prevents air generated by beater 48 from escaping out of the top of the beater.

As shown in FIG. 1, the majority of the beater is enclosed so that most of the air flow generated by the beater assembly will be directed downwardly and rearwardly. To control the air flow generated by the beater assembly, a controlling means 90 is positioned in the path of the air flow. The controlling means comprises an air impervious plate 92, which extends between and is mounted to sidewalls 56, 58 by nuts and bolts 94. These nuts and bolts pass through holes 95 of the sidewall and lip 96 formed on the top and bottom of either side of the plate. A plurality of holes 95 are located in the sidewalls so that the position of the plate can be moved to accommodate various air flow and grain discharge conditions encountered with different crops. This plate is positioned to the rear of discharge beater assembly 22 and is inclined angularly, so that its top surface is in the path of the air flow generated by the beater assembly. Also, the alignment of the plate is such that a portion of the plate is positioned below the beater assembly. As stated hereinabove, a portion of the crop material being discharged by the rear discharge beater is impelled upwardly and rearwardly against the roof of hood 24. After hitting the roof the crop material is directed downwardly onto the cleaning sieves 40. The position and alignment of plate 92 is such that it deflects the downwardly directed crop material prior to its landing on the cleaning sieves. This deflection of the material decreases the force at which the material lands on the cleaning sieves, thereby eliminating the possibility that damage may be caused by the falling crop material.

An opening 100 is included in sidewalls 56 and 58 to enable the operator to have easy access to the beater assembly and the controlling means. A removable cover, not shown, is placed over the opening to prevent any crop material or grain from inadvertently being discharged through the sidewalls of the combine.

As illustrated in FIG. 1, the plate is positioned such that the air flows generated by the beater assembly, indicated by arrow C, and the air flow of blower 44 of the cleaning means, indicated by arrow D, are maintained in separate paths as they move through the combine. The separation of air flows prevents disruptive air currents from being generated above the cleaning sieves by the mingling of the air streams. These disruptive air currents can cause a substantial increase in a percentage of grain loss due to grain inadvertently being blown rearwardly off the sieves and out of opening 26. The air currents generated by the beater assembly have a tendency to block the flow of air through the cleaning sieves, thereby eliminating the pneumatic effect this air flow has on material positioned on the sieves. When the air flow through the sieves is terminated, the grain and crop material positioned on the sieves is moved rearwardly, by the reciprocating action of the sieves, and off the ends of the sieves and out discharge opening 26 of the combine. This movement of grain and crop material off the ends of the cleaning sieves can cause an increase in the percentage of grain lost during the harvesting operation. Therefore, the elimination of air currents generated in the immediate vicinity of the cleaning sieves is important to keep grain losses at acceptable levels. Plate 92 is also positioned and aligned such that the crop material, impelled rearwardly and discharged by beater assembly 22, can move across and above the top surface of the plate; thereby not interfering with the discharge operation of the beater assembly.

While the preferred structure in which the principles of the present invention have been incorporated is shown and described above, it is to be understood that the invention is not to be limited to the particular details shown and described above, but that, in fact, widely different means may be employed in the practice of the broader aspects of the invention.

Having thus described the invention, what is claimed is:

1. In an axial flow combine having a frame adapted to travel across a field, axially arranged means mounted on said frame for threshing and separating grain from the remaining crop material and discharging said crop material at a rear end thereof, an operable discharge assembly mounted to said frame adjacent said rear end of said axially arranged means for receiving said crop material therefrom and propelling said material generally rearwardly out of the combine, said assembly creating a generally rearwardly and downwardly directed air stream when operating, grain receiving and cleaning means mounted to said frame spaced below said axially arranged means and said discharge assembly and extending to adjacent the rear of the combine, and means for passing a stream of air generally upwardly and rearwardly through said cleaning means to clean the grain received thereby, said stream of air generally converging toward said rearwardly and downwardly directed air stream created by said discharge assembly, wherein the improvement comprises:

means generally impervious to the passage of air being mounted to said frame generally adjacent the rear of said discharge assembly, said air impervious means extending from one location somewhat below said rear of said discharge assembly upwardly and rearwardly to another location more rearwardly of said discharge assembly than said one location but generally lower than said rearwardly propelling crop material for providing substantial separation between said discharge assembly air stream and said cleaning means air stream to thereby substantially prevent mingling of said air streams and formation of disruptive air currents therefrom which might interfere with cleaning of said grain received by said cleaning means.

2. An axial flow combine, as set forth in claim 1, wherein said air impervious means comprises a plate member having a top surface generally extending angularly across the path of the air stream generated by the discharge assembly.

3. An axial flow combine, as set forth in claim 2, wherein said plate member is adjustably mounted to said frame.

4. An axial flow combine, as set forth in claim 1, wherein:

said discharge assembly includes a beater for engaging and impelling said crop material rearwardly out of the combine, said cleaning means includes a sieve transversely mounted to receive grain removed from the crop material, said means for passing air through said sieve to clean air thereon comprises a blower mounted to said frame generally below said sieve, and said air impervious means in extending between said locations with respect to said discharge assembly substantially prevents said air stream generated by said beater from interfering with the air passing through said sieve.

5. An axial flow combine, as set forth in claim 4, wherein said beater comprises a rotatably mounted shaft having paddles mounted thereon and extending substantially radially outwardly therefrom for urging and directing said crop material rearwardly thereby generating a generally rearward and downward air stream.

6. An axial flow combine, as set forth in claim 1, wherein said air impervious means generally extends angularly across the path of a portion of the crop material impelled by said discharge assembly to deflect such material and thereby decrease the force at which said material is delivered, if at all, onto said cleaning means.

* * * * *

UNITED STATES PATENT OFFICE
CERTIFICATE OF CORRECTION

Patent No. 3,916,912  Dated November 4, 1975

Inventor(s) Edward W. Rowland-Hill

It is certified that error appears in the above-identified patent and that said Letters Patent are hereby corrected as shown below:

Column 3, Line 9, delete "theough" and insert therefor --through--;

Column 3, Line 22, after "bly" insert --22--;

Column 6, Line 41, delete "air" and insert therefor --grain--.

Signed and Sealed this

*thirteenth* Day of *April 1976*

[SEAL]

Attest:

RUTH C. MASON
*Attesting Officer*

C. MARSHALL DANN
*Commissioner of Patents and Trademarks*